United States Patent Office 3,539,595
Patented Nov. 10, 1970

1

3,539,595
PROCESS FOR POLYAMINO COMPOUNDS FROM 6-AMINOMETHYL-5,6-DIHYDRO-4H-PYRANS
Wolfgang Heydkamp, Leverkusen, and Rudolf Braden, Odenthal-Scheuren, Germany, assignors to Farbenfabriken Bayer Aktiengesellschaft, Leverkusen, Germany, a corporation of Germany
No Drawing. Filed Feb. 14, 1968, Ser. No. 705,321
Claims priority, application Germany, Feb. 16, 1967, F 51,542
Int. Cl. C07d 7/04
U.S. Cl. 260—345.8
9 Claims

ABSTRACT OF THE DISCLOSURE

A process for the preparation of high molecular weight aliphatically bound polyamino compounds by reacting a polyhydroxyl compound having a molecular weight of at least 250 with a compound having the formula

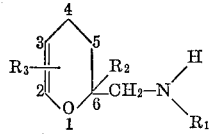

wherein $R_1$ is hydrogen, alkyl having 1 to 6 carbon atoms, cycloalkyl or cycloalkenyl; $R_2$ is hydrogen, methyl or ethyl and $R_3$ is hydrogen or methyl that is present only in position 2 or 3; said reaction occurring in the presence of carbon dioxide.

---

This invention relates to the preparation of polyamino compounds and to a method of preparing the same. More particularly, this invention relates to the preparation of high molecular weight polyamino compounds prepared from 6-aminomethyl-5,6-dihydro-4H-pyran derivatives. It is known that alcohols, phenols and other compounds which contain OH or SH groups can be added onto the 5,6-dihydro-4H-pyran system (see Houben-Weyl, vol. 6/4, pp. 366, 368 et seq. and 381 et seq.). According to Dutch patent specification 6601435 this reaction can be extended to higher molecular weight compounds containing OH or SH groups. All these known reactions will, however, only proceed at technically acceptable reaction velocities and give satisfactory yields if they are carried out in the presence of strong mineral acids such as hydrochloric acid, sulphuric acid or phosphoric acid or Friedel-Crafts catalysts such as phosphorus oxychloride or ferric chloride.

The addition process cannot be carried out with catalytic quantities of mineral acids but requires the use of mineral acids in excess as shown in the examples of Dutch patent specification 6601435 wherein the HCl concentration, for example, must be so high that the amino derivative of 5,6-dihydro-4H-pyran entering into the reaction is first converted quantitatively into the ammonium salt, and only the excess of HCl is available for catalysis activity. Owing to the large quantiy of mineral acid used, one thus also obtains as addition products salts of amines, which have to be converted into the free amines by means of bases such as aqueous NaOH, KOH or $Na_2CO_3$ solution. High molecular weight ammonium salts, however, are powerful emulsifiers, so that conversion of the ammonium group into the free amine is a complicated and time consuming procedure which requires additional materials and is commercially unacceptable.

It is therefore an object of this invention to provide amino terminated high molecular weight compounds. It is another object of this invention to provide a method of making high molecular weight aliphatic primary or secondary amines that overcome the methods heretofore known. It is another object to provide a method of making high molecular weight amino compounds without the concurrent production of unwanted side reaction products.

The foregoing objects and others which will become apparent from the following description are accomplished in accordance with the invention generally speaking by providing a process for preparing high molecular weight aliphatically bound polyamino compounds by reacting a polyhydroxyl compound having a molecular weight of at least 250 with a compound having the formula

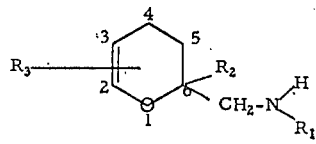

wherein $R_1$ is hydrogen, alkyl having 1 to 6 carbon atoms, cycloalkyl or cycloalkenyl; $R_2$ is hydrogen, methyl or ethyl and $R_3$ is hydrogen or methyl that is present only in position 2 or 3; said reaction occurring in the presence of carbon dioxide. The 6-aminomethyl-5,6-dihydro-4H-pyran derivatives are readily available commercially. The amino compounds formed are at least difunctional primary or secondary aliphatic polyamino compounds depending upon the functionality of the polyhydroxyl compound, which may contain ether, thioether, ester, urethane, carbonate, acetyl groups or combinations of the above.

In the present invention, the complications known from the prior art do not occur. Although salt formation takes place during the rapid reaction between the starting materials 5,6-dihydro-4H-pyran derivative and higher molecular weight hydroxyl compound, the salts formed are easily decomposed again by heat; it is therefore unnecessary to carry out any neutralization such as was previously necessary for isolating the free amine.

Any suitable 6-aminomethyl-5,6-dihydro-4H-pyran may be used as a starting material according to the invention, such as, for example, 6-aminomethyl-5,6-dihydro-4H-pyran;
6-N(methyl)-aminomethyl-5,6-dihydro-4H-pyran;
6-N(ethyl)-aminomethyl-5,6-dihydro-4H-pyran;
6-N(propyl)-aminomethyl-5,6-dihydro-4H-pyran;
6-N(isopropyl)-aminomethyl-5,6-dihydro-4H-pyran;
6-N(butyl)-aminomethyl-5,6-dihydro-4H-pyran;
6-N(isobutyl)-aminomethyl-5,6-dihydro-4H-pyran;
6-N(pentyl)-aminomethyl-5,6-dihydro-4H-pyran;
6-N(hexyl)-aminomethyl-5,6-dihydro-4H-pyran;
6-N(cyclopentyl)-aminomethyl-5,6-dihydro-4H-pyran;
6-N(cyclohexyl)-aminomethyl-5,6-dihydro-4H-pyran;
6-N(cyclohexenyl)-aminomethyl-5,6-dihydro-4H-pyran;
6-methyl-(aminomethyl)-5,6-dihydro-4H-pyran;
6-ethyl(aminomethyl)-5,6-dihydro-4H-pyran;
3-methyl-6(methyl)-aminomethyl-5,6-dihydro-4H-pyran;
3-methyl-6(aminomethyl)-5,6-dihydro-4H-pyran and the like.

Any suitable high molecular weight polyhydroxyl compound having a molecular weight of at least 250 and preferably from about 250 to about 6000 include polyfunctional compounds which contain at least two OH groups, such as, OH-containing polybutadiene polymers or copolymers of butadiene with acrylonitrile, methacrylonitrile or styrene, OH-containing polystyrenes, partially saponified polyvinyl acetates and copolymers of vinyl acetate with ethylene or styrene, polyethers such as polyethylene glycol ether, polypropylene glycol-(1,2)-ether, polypropylene glycol-(1,3)-ether, polybutylene glycol-(1,4)-ether, polybutylene glycol-(1,2)-ether, polypentanedio l- (1,5) - ether, polyhexanediol-(1,6) - ether, mixed ethers, for example from polyethylene-polypropylene glycol ether or polypropylene-(1,2)-polybutylene glycol ether, oxyalkylation products which can be derived from trimethylolpropane, glycerol, sorbitol, saccharose, or from higher functional, low molecular weight polyhydroxyl compounds and the like; polythioethers which can be synthesized in known manner from low molecular weight diols such as butanediol, hexanediol, decanediol and mercaptoglycols such as dihydroxyethylthiomercaptans or dihydroxypropylthiomercaptans; polyesters, such as the polyesters of succinic acid-ethylene glycol, succinic acid-butylene glycol, adipic acid-ethylene glycol, adipic acid-butylene glycol, adipic acid-hexylene glycol, adipic acid-ethylene-neopentyl glycol, adipic acid-hexylene-neopentyl glycol, adipic acid-diethylene glycol, azelaic acid-dipropylene glycol and also lactone polyesters, those from other acids and alcohols such as methyladipic acid, citraconic acid, fumaric acid, glutaric acid, maleic acid, malonic acid, oxalic acid and the like; trimethylolethane, trimethylolpropane, pentaerythritol, glycerol, and the like; polycarbonates such as the condensation products of diaryl carbonates, such as diphenyl carbonate with hexanediol-(1,6), octanediol-(2,6), decanediol-(1,10), decanediol-(2-7), -(2,8), -(2,9), and mixed polycarbonates of hexanediol-(1,6) and 4,4'-dihydroxydiphenyl-2,2-propane and others described in U.S. at. 3,028,365; suitable polyacetals, such as, condensation products of divalent aliphatic polyalcohols such as butanediol-(1,3), butanediol-(1,4), hexanediol-(1,6), di-, tri- and polyethylene glycols, bis-(hydroxyalkylated) diphenols, for example of hydroquinone, resorcinol, 1,5-dihydroxynaphthalene, 4,4'-dihydroxydiphenyl propane or 4,4'-dihydroxydiphenylsulfone, with aldehydes such as formaldehyde, acetaldehyde, benzaldehyde or crotonaldehyde and the like.

In addition, the said OH-containing hydrocarbons, polyethers, polythioether, polyesters, polycarbonates, or polyacetals may be pre-extended with diisocyanates, wherein a deficiency of diisocyanate is used and preferably n mols of the diisocyanate being reacted with $n+1$ mols of the hydroxyl containing compounds, the proportions being so chosen that the molecular weights of the end product do not exceed 6000.

Any suitable diisocyanate for the pre-extending step may be used, such as, for example, 1,3- or 1,4-phenylene-diisocyanate, 2,4- or 2,6- toluylene diisocyanate and mixtures thereof, naphthalene-1,5-diisocyanate, 4,4'-diphenylmethane-diisocyanate, hexamethylene-diisocyanate, decamethylenediisocyanate and the numerous others known in the urethane art.

The process according to the invention is carried out by adding the reactants together at room temperature, if desired in the presence of solvents which must be so chosen that they do not contain any groups that are reactive with the 5,6-hyhydro-4H-pyran system, adding solid or gaseous $CO_2$ to the reaction mixture and heating for some time to elevated temperatures. A suitable temperature range is between 0 and 150° C., to about 80° C. being preferred. The carbon dioxide should preferably be employed under a pressure of 0.1 to 200 atmospheres above atmospheric pressure, preferably 2 to 50 atmospheres in order to achieve high yields. The reaction time varies between 15 minutes and 48 hours but is preferably 1 to 5 hours. When the $CO_2$ excess pressure has been released, the material is degasified by brief application of a vacuum, and unreacted amine is then distilled off at elevated temperature, if desired together with the solvent used. The higher molecular weight amino compound is obtained which does not require any further purification. The degree of purity of the higher molecular weight amino compounds is assessed by the "amine equivalent" determined by titration in 50% methanol, i.e. the millimols of hydrochloric acid per gram of material, as well as by the IR spectra.

Suitable inert solvents which may be used for the process according to the invention are dimethylether diethylether, dibutylether, tetrahydrofuran, diaoxine, benzene, toluene, xylene, chlorobenzene, dichlorobenzene, trichlorobenzene, nitrobenzene, dimethylformamide, cleaning grade petroleum hydrocarbons, ligroin or petroleum ether, paraffin oil, cyclohexane or mixtures of these.

The reactants may be employed in proportions which may vary from ⅒ of the stoichiometrically required quantity to a 10 times excess of the dihydropyran component. Accordingly, only a small part of the major portion of the higher molecular weight hydroxyl compound is converted into the polyfunctional amine. The carbon dioxide used as reaction catalyst is in all cases used in excess.

The higher molecular weight amino derivatives are valuable starting materials for the synthesis of elastomers since they yield interesting synthetic resins both by the diisocyanate polyaddition process and in the reaction with epoxides. They are also suitable starting materials for the synthesis of flotation agents and emulsifiers. The amino compounds can be reacted with diisocyanates to produce porous or nonporous polyurethanes which may be used in making bedding, cushions, shock absorbers, flooring, automotive parts such as bumpers and the like.

The invention will be further illustrated by the following examples in which parts are by weight unless otherwise specified.

EXAMPLE 1

In an autoclave, about 200 parts of solid carbon dioxide are added with stirring to a solution of about 25 parts (220 mmol) of 6-amino-methyl-5,6-dihydro-4H-pyran, about 200 parts of polypropylene glycol-(1,2)-ether (100 mmol) and about 80 parts by volume of dioxane, and the autoclave is sealed and slowly heated to about 60° C. The $CO_2$ pressure rises to about 80 excess atmospheres in the course of about 25 minutes and is left at that level for about 4 hours. After release to atmospheric pressure, the material is degasified and is freed from unreacted amine in a water jet vacuum at a bath temperature of 115 to 120° C. About 8.25 parts (73 mmol) of distillate are obtained (boiling point 60 to 71°/12 mm. Hg). The residue in the flask is a thin pale brown oil which has an NH equivalent of 0.605 (theory 0.900) corresponding to 67% of the theoretical yield of diamine.

EXAMPLE 2

Employing the same apparatus, a solution of about 57 parts (0.5 mol) of 6-aminomethyl-5,6-dihydro-4H pyran and 245 parts (0.25 mol) of linear polypropylene glycol-(1,2)-ether is reacted at about 100° C. under two excess atmospheres of $CO_2$ in about 2.25 hours, and is then cooled and the pressure is released and the reaction product is degasified. After the removal of unreacted amine (about 34.6 parts of colorless liquid with $n_D^{20}=1.4821$), about 252 parts of a dark yellow oil of medium viscosity is obtained which has an NH equivalent of 0.636 (theory 1.603), corresponding to 40% of the theoretical amount of diamine.

EXAMPLE 3

A solution of about 36.7 parts (324 mmol) of 6-aminomethyl-5,6-dihydro-4H-pyran and about 156 parts (100 mmol) of a branched polypropylene glycol-(1,2)-ether which can be obtained by a known condensation reaction from trimethylolpropane and propylene oxide, and about 50 parts of volume of dioxane is heated in an autoclave to about 80° under 60 to 62 excess atmospheres of $CO_2$ for about 3 hours. After degasification, dioxane and unreacted amine (190 mmol) are distilled off at a bath temperature of about 120° C. at about 12 mm. Hg and a pale brown liquid of low viscosity is obtained which has an NH equivalent of 0.476 (theory 1.580).

EXAMPLE 4

About 56.5 parts (0.50 mol) of 6-aminomethyl-5,6-dihydro-4H-pyran are dissolved in about 168 parts (0.25 mol) of linear polypropylene glycol-(1,2)-ether, and reacted for about 2½ hours at about 100° C. under a $CO_2$ excess pressure of 5.5 atmospheres. The resulting reaction mixture is then degasified, about 31.2 parts of unreacted amine are distilled off at a bath temperature of about 120° C. at about 12 mm. Hg, and as residue there is obtained a dark brown liquid of medium viscosity which has an NH equivalent of 0.940 (theory 2.230).

EXAMPLE 5

About 37.4 parts (330 mmol) of 6-aminomethyl-5,6-dihydro-4H-pyran are added to about 246 parts (150 mmol) of melted polyethylene glycol ether and heated in an autoclave at about 60° C. under an excess $CO_2$ pressure of about 40 atmospheres for about 2½ hours. After release of pressure, a pale yellow, solid reaction product is obtained; about 100 parts by volume of benzene are poured over this and the mixture is heated to about 60° C., a clear, pale brown solution being formed and a large amount of $CO_2$ escaping. After removal of the solvent and unreacted amine (160 mmol) by distillation, a liquid of medium viscosity and with an NH equivalent of 0.538 (theory 1.072) is obtained in a more than 92% yield.

EXAMPLE 6

About 50.0 parts (440 mmol) of 6-aminomethyl-5,6-dihydro-4H-pyran are added to about 178 parts (200 mmol) of polybutylene glycol-(1,4)-ether in about 200 parts by volume of tetrahydrofuran, and the reaction mixture is heated in an autoclave at about 60° C. under an excess $CO_2$ pressure of about 40 atmospheres for about 2½ hours. The degasified reaction product is freed from solvent and unreacted amine is distilled off at about 120° C./12 mm. Hg (300 mmol); the pale yellow residue (yield 82% of the theory) has an NH equivalent of 0.556 (theory 1.782).

EXAMPLE 7

By means of the known reaction of 2 mols of polypropylene glycol-(1,2)-ether with 1 mol of 1,6-hexamethylenediisocyanate, a polyhydroxyl compound of molecular weight 2020, determined by OH end group analysis, is obtained by reaction for about 6 hours at 125 to 130°.

About 45.3 parts (400 mmol) of 6-aminomethyl-5,6-dihydro-4H-pyran are added to about 202 parts (100 mmol) of this pre-extended polyether in about 250 parts by volume of dioxane and the reaction mixture is heated to about 60° C., and about 100 excess atmospheres of $CO_2$ are introduced under pressure for about 4½ hours. After degasification of the reaction product, dioxane and unreacted amine (270 mmol) are distilled off, and a dark brown oil of medium viscosity which has an NH equivalent of 0.385 (theory 0.890) is obtained as the residue.

EXAMPLE 8

As in Example 7, about 2 mols of polypropylene glycol-(1,3)-ether are reacted with about 1 mol of naphthylene diisocyanate-(1,5) by heating for about 3 hours at about 100 to about 105° C., a material of molecular weight 1560 which has OH end group being obtained as the reaction product.

About 78 parts (50 mmol) of this polyhydroxyl compound are dissolved in 20 parts by volume of tetrahydrofuran and a solution of about 13.6 parts (120 mmol) of 6-aminomethyl-5,6-dihydro-4H-pyran in about 50 parts by volume of tetrahydrofuran is added. The reaction mixture is saturated with $CO_2$ and maintained at an excess pressure of about 0.1 atmospheres for about 10 hours at about 50° C. After leaving the resulting reaction mixture to stand overnight, the reacted amine is distilled off together with the solvent at a bath temperature of about 120° C. at 11 mm. Hg, and a pale brown oil of medium viscosity is obtained which has an NH equivalent of 0.10 (theory 1.130).

EXAMPLE 9

About 31.0 parts (220 mmol) of 3,6-dimethyl-6-aminomethyl-5,6-dihydro-4H-pyran are added to about 200 parts of polypropylene glycol-(1,2)-ether (100 mmol) in about 50 parts by volume of a mixture of tetrahydrofuran and benzene (1:1) and the reaction mixture is kept under an excess $CO_2$ pressure of 35 to 38 atmospheres at about 60° C. for about 3½ hours. The degasified, pale yellow liquid produced, on distillation, 89 mmol of unreacted amine and, in 92% yield, a diamine of NH equivalent 0.596 (theory 0.866), corresponding to 69% of the theory.

EXAMPLE 10

2 mols of polypropylene glycol-(1,2)-ether are reacted in known manner with 1 mol of 1,6-hexamethylenediisocyanate. A polyether-urethane is obtained with terminal OH groups and a molecular weight of 2188. The reaction is performed for about 6 hours at 125° C. 219 parts (0.1 mol) of the polyether-urethane thus obtained are reacted with about 31 parts (0.22 mol) of 3,6-dimethyl-6-aminomethyl-5,6-dihydro-4H-pyran in about 50 parts by volume of tetrahydrofurane, a pale yellow oil of medium viscosity results which has an NH equivalent 0.570 (theory 0.801), corresponding to 71.5% of the theoretical amount of diamine.

EXAMPLE 11

About 201 parts (100 mmol) of hexanediol-polycarbonate are dissolved in about 200 parts by volumne of anhydrous tetrahydrofuran at about 50° C., about 31 parts (220 mmol) of 3,6-dimethyl-6-aminomethyl-dihydro-4H-pyran are introduced, and 30 to 35 excess atmospheres of $CO_2$ are introduced under pressure for about 3 hours at the same temperature. The viscous liquid reaction product is freed from unreated amine (164 mmol) in a thin layer evaporator at 75°/0.08 mm. Hg. The honey yellow, tough resin crystallizes at room temperature and has an NH equivalent of 0.380 (theory 0.874) corresponding to 43.5% of the theoretical amount of diamine.

EXAMPLE 12

About 31 parts (220 mmol) of 6-methyl-6-(N-methylaminomethyl)-dihydro-4H-pyran are added to about 226 parts of OH-containing polybutadiene (100 mmol) dissolved in about 75 parts by volume of dioxane, and $CO_2$ is introduced under an excess pressure of 52 to 55 atmospheres at about 60° C., a highly viscous, dark-yellow solution being formed. After removal of unchanged amine (166 mmol) in a thin layer evaporator at about 130°/0.08 mm. Hg., a highly viscous oil is obtained which has an NH equivalent of 0.100 (theory 0.786).

EXAMPLE 13

About 31.0 parts (220 mmol) of 3,6-dimethyl-6-aminomethyl-5,6-dihydro-4H-pyran are added to about 290 parts (100 mmol) of an OH-containing copolymer of polybutadiene and acrylonitrile dissolved in about 120 parts by volume of tetrahydrofuran, which copolymer has an acrylonitrile content of 15.5 mols percent and OH functionality 2.10 and $CO_2$ is introduced under an excess pressure of about 45 atmospheres at about 55° C. for about 6 hours. After thin layer evaporation at 130°/0.08 mm. Hg., a tough viscous oil is obtained which has an NH equivalent of 0.476 (theory 0.628).

It is to be understood that the examples present the best mode and are not to be construed as limiting the scope. Further, any of the polyhydroxyl compounds, 6-aminomethyl-5,6-dihydro-4H-pyrans, solvents, or the like

What is claimed is:

1. A process for the preparation of high molecular weight aliphatically bound polyamino compounds which comprises reacting a polyhydroxyl compound having a molecular weight of at least 250 with a compound having the formula

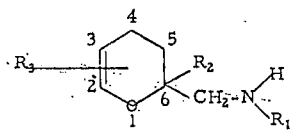

wherein $R_1$ is hydrogen, alkyl having 1 to 6 carbon atoms, cycloalkyl or cycloalkenyl; $R_2$ is hydrogen, methyl or ethyl and $R_3$ is hydrogen or methyl that is present only in position 2 or 3; said reaction occurring in the presence of carbon dioxide.

2. The process of claim 1 wherein the reaction is conducted under a pressure of 0.1 to 200 atmospheres of carbon dioxide above atmospheric pressure.

3. The process of claim 1 wherein the reaction is conducted under a pressure of 2 to 50 atmospheres above atmospheric pressures.

4. The process of claim 1 wherein the reaction is conducted at a temperature of 0° C. to 150° C.

5. The process of claim 1 wherein the reaction is conducted at a temperature of 0° C. to 80° C.

6. The process of claim 1 wherein the reaction is conducted in an inert solvent or mixture of inert solvents.

7. The process of claim 1 wherein the $CO_2$ is present in excess.

8. The process of claim 1 wherein the molceular weight of the polyhydroxy compound is from about 250 to about 600.

9. The process of claim 1 wherein the polyhydroxy compound is a polyester, polyether, polythioether, polycarbonate, polyurethane or polyacetal.

References Cited

UNITED STATES PATENTS 2,544,392  3/1951  Moore et al. _____ 260—614

FOREIGN PATENTS 6,601,435  8/1966  Netherlands.
6,605,411  10/1966  Netherlands.

NORMA S. MILESTONE, Primary Examiner

U.S. Cl. X.R.

260—345.9, 2, 2.5, 47, 49, 51, 59, 67, 75, 77.5, 78.3, 79, 80, 83.3, 85.1, 87.3, 89.1, 94.7, 93.5